United States Patent [19]

Erhart et al.

[11] Patent Number: 5,122,778
[45] Date of Patent: Jun. 16, 1992

[54] SERIAL WORD COMPARATOR

[75] Inventors: Richard A. Erhart, Boynton Beach; Walter L. Davis, Coral Springs; Barry W. Herold, Boca Raton, all of Fla.

[73] Assignee: Motorola, Inc., Schaumburg, Ill.

[21] Appl. No.: 679,811

[22] Filed: Mar. 28, 1991

Related U.S. Application Data

[63] Continuation of Ser. No. 316,208, Feb. 27, 1989, abandoned.

[51] Int. Cl.⁵ ............................................. G06F 7/02
[52] U.S. Cl. ............................ 340/146.2; 364/715.11
[58] Field of Search ............. 364/715.11, 200, 900; 340/146.2; 371/69.1, 70, 71

[56] References Cited

U.S. PATENT DOCUMENTS

| | | | |
|---|---|---|---|
| 2,848,532 | 8/1958 | Weida | 371/69.1 |
| 3,103,577 | 9/1963 | Willard | 371/69.1 |
| 3,344,353 | 9/1967 | Wilcox | 371/69.1 |
| 3,469,084 | 9/1969 | Garrett et al. | 371/69.1 |
| 3,784,980 | 1/1974 | Geesen | 364/715.11 |
| 3,863,215 | 1/1975 | McGrogan, Jr. | 371/69.1 |
| 4,064,488 | 12/1977 | Chapman | 371/69.1 |
| 4,103,286 | 7/1978 | Nicolini et al. | 340/146.2 |
| 4,734,676 | 3/1988 | Huon et al. | 364/715.11 |

Primary Examiner—David H. Malzahn
Attorney, Agent, or Firm—Philip P. Macnak; Vincent B. Ingrassia; William E. Koch

[57] ABSTRACT

An apparatus for determining if a received binary word corresponds to the true or complement version of a stored binary word includes means for serially multiplexing the bits of each binary word to the inputs of an exclusive OR gate. The exclusive-OR gate generates a logical high signal each time a mismatch occurs. These signals are applied directly to an error counter and, after inversion, to a match counter. The contents of the error counter and match counter are compared to a stored threshold number. A first signal is generated if the contents of the error counter exceeds the threshold. A second signal is generated if the contents of the match counter exceeds the threshold. Upon the occurrence of both signals, the serial comparison process is terminated.

18 Claims, 2 Drawing Sheets

SERIAL WORD COMPARATOR

This is a continuation of application Ser. No. 07/316,208, filed Feb. 2, 1989 now abandoned.

BACKGROUND OF THE INVENTION

This invention relates generally to a selective call radio receiver, and in particular to an apparatus for performing a serial comparison of two binary words. More particularly, the invention relates to an apparatus for performing the serial comparison of successive data words received by a selective call radio receiver (pager) with a stored reference word (address). Still more particularly, the invention relates to an apparatus for performing the serial comparison of a data word or the inverse thereof with a stored reference word.

A personal paging device typically comprises a binary digital FM receiver consisting of a radio frequency (RF) section and a decoder section. A page is received via an RF carrier that is frequency modulated by a coded binary sequence. The circuits in the RF section perform the RF/IF conversions, frequency demodulations, and the logic-level decision functions to recover the audio output signal that represents the coded binary data. A control section processes the coded data using digital techniques to control the audible and/or visual alerts.

Many types and formats of signal coding may be utilized in present day paging systems. One known type is the Golay Sequential Code (GSC). GSC is a selective call paging protocol, a full description of which may be found in a paper entitled "Selective Signalling for Portable Applications" by Leonard E. Nelson, 28 IEEE Vehicular Technology Conference, Denver, Colo., Mar. 22-24, 1978. The GSC is a synchronous paging format that allows pagers to be transmitted individually or in batches, and accommodates tone-only, tone-and-data, and tone-and-voice paging. It also provides improved battery-saving capability and an increased code capacity. A positive logic convention is used.

The GSC utilizes a single-call address format which consists of a preamble, a start code, and an address code, and an activation code for voice paging. Individual receivers within the system are divided into groups by means of a preamble. The start code marks the end of the preamble and supplies timing information for batch mode decoding. The address code uniquely identifies each receiver, and the activation code controls the audio circuits for voice paging.

A data message consists of an address followed by one or more data blocks. These data messages may be transmitted individually in the single-call mode, or intermixed with address-only pages in the batch mode of transmission.

The address information is transmitted as two Golay address words (W1 and W2) each comprised of 23 bits. The W1 code set comprises 50 words and their complements while the W2 code set consists of approximately 2,000 words and their complements. Thus, the unique W1/W2 combinations selected from the two code sets, provide for 100,000 GSC codes.

A GSC code is a unique combination of a first GSC binary word (W1) and a second GSC binary word (W2) that may be assigned to a specific pager, and each GSC code is capable of providing four different functional addresses (W1W2, W1 $\overline{W2}$, $\overline{W1}$ W2, and $\overline{W1}$ $\overline{W2}$). Each functional address defines how the addressed pager responds. Soome available functions are tone only page, tone only page with priority, voice page. alphanumeric data page, etc. Thus, it is necessary that the pager be capable of decoding two binary words and/or their inverse words or complements. As is well known, inverse binary words are created by substituting binary ones for binary zeroes and binary zeroes for binary ones within the binary stream.

The pager decoder must compare incoming binary addresses with the GSC address code assigned to and stored within the pager. Many techniques for comparing binary words are known, the simplest involving storing each word in a register each comprised of a series of storage elements and comparing the contents of the storage elements in parallel to determine if a match exists. This process is quick but requires dedicated circuitry for each bit to be compared. In the case of a GSC code, twenty-three bits are transmitted to the pager, and the pager samples each bit four times resulting in a 92 bit data stream. Obviously, a parallel comparison of a 92 bit address word with an internally stored word would require very large registers.

Alternatively, it is known to compare binary data words serially (bit by bit). If a perfect match were required, the comparison process could be terminated as soon as a mismatched between corresponding bits in each word was detected. In the case of Golay, twelve errors may be found in the 92 bit data stream and still result in a match. Unfortunately, it is not known whether the received word is in its true or complement form. Therefore, a detection of greater than twelve errors does not necessarily mean a mismatch. It may mean that the inverse word ($\overline{W}$ 1/ or $\overline{W}$ 2/) is being received.

In order to provide for the decoding of the word in either its true or complement form, it is known to serially compare each bit of the 92 bit word and if either less than thirteen errors or more than 79 errors are detected, a match is declared. That is, if less than thirteen errors are detected it is presumed that the correct word W1 or W2 in its true form has been received. If, alternatively, more than 79 errors has been detected, it is assumed that the correct word in its inverse form ($\overline{W1}$ or $\overline{W2}$) has been received. Unfortunately, this approach requires that all of the bits in the 92 bit data stream be compared. This takes a great deal of time and requires consumption of a significant amount of power which, in the case of a battery operated pager, is disadvantageous.

SUMMARY OF THE INVENTION

It is an object of the present invention to provide an improved apparatus for performing a serial comparison between two binary words.

It is a further object of the present invention to provide an apparatus for performing the serial comparison of two data words which utilizes less circuitry and consumes less power.

It is a still further object of the present invention to provide an apparatus for performing the serial comparison of successive data words received by a selective call radio receiver (pager) with a stored reference word (address).

It is another object of the present invention is to provide an apparatus for performing a serial comparison of a data word or the complement thereof with a stored reference word.

According to a broad aspect of the invention there is provided an apparatus for comparing first and second binary words each including a plurality of bits occupying specific bit positions, each bit capable of assuming first and second states. First means are provided for serially comparing the bits of the first and second binary words occupying corresponding bit positions and including means for generating a first output signal for each match detected and a second output signal for each mismatch detected. Counting means provides first and second counts of the first and second output signals being detected, the counts identifying the relative correlation between the second binary word and the first and second states of the first binary word. An error count generating means generates a first error count signal when the first count exceeds a first predetermined number, and a second error count signal when the second count exceeds a second predetermined number. In response to the coincidence of the first and second error count signals being generated, further comparison of the first and second binary words by the first means is disabled.

The above objects, features and the advantages of the present invention would be more clearly understood from the following detailed description taken in conjunction with the accompanying drawings, in which:

DESCRIPTION OF THE PREFERRED EMBODIMENT

Figure 1:
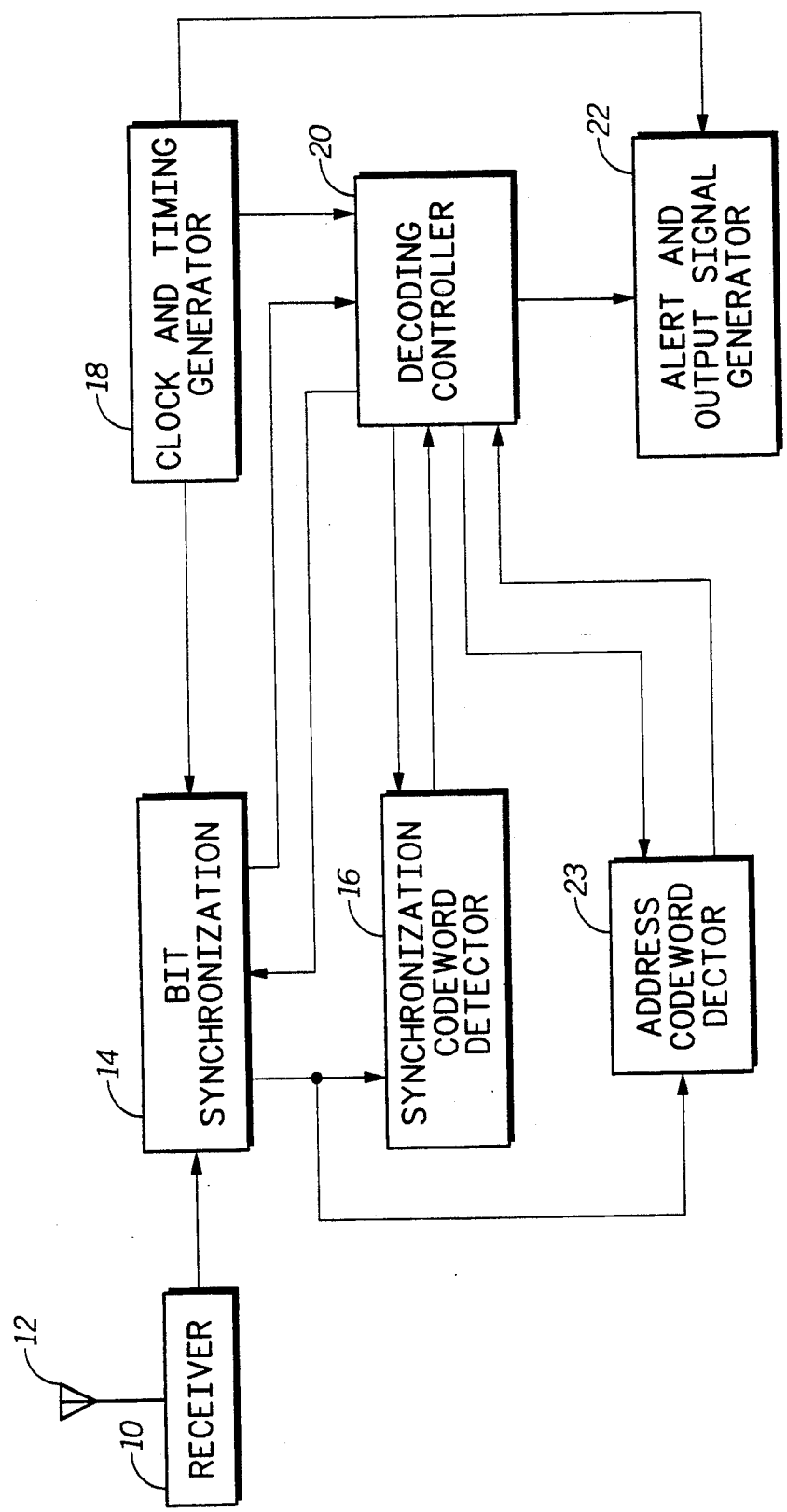
FIG. 1 is a block diagram of a selective call paging receiver.

FIG. 1 is a functional block diagram of a selective call radio receiver apparatus (i.e. a pager). The system comprises receiver 10 equipped with antenna 12, a bit synchronization circuit 14, a synchronization codeword detector 16, a clock and timing generator 18, a decoding controller 20, an alert and output signal generator 22, and an address codeword detector 23.

A modulated signal is received at receiver 10 by means of antenna 12. The operative receiver 10 is applied to a bit synchronization circuit 14 whose function it is to synchronize the bit decision circuit elements therein with the received signal bit stream. When the apparatus is first turned on, it will attempt to achieve bit synchronization. If bit synchronization is established, bit synchronization circuit 14 will activate synchronization codeword detector 16 which searches for a synchronization codeword.

Synchronization codeword detector 16 functions as a bit-by-bit correlator, and if a received bit sequence differs from the synchronization codeword sequence in less than a predetermined number of bit positions, the synchronization codeword detector informs decoding controller 20 that a synchronization codeword has been detected. Decoding controller 20 then switches the reference codeword sequence to the address sequence of the pager, and address codeword detector 23 then searches for address codewords. Address codeword detector 23 is capable of detecting as many as four different functions associated with one address word.

When address function is detected, one or more alert signals are generated by alert and output signal generator 22. A different alert pattern may be generated for each of the four functions associated with a single address. The alerts may be visual, audible, and/or tactile (vibratory).

Clock and timing generator 18 may include a crystal controlled clock oscillator and a timing chain driven by the oscillator. Generator 18 provides all the timing signals required for the operation of the bit synchronization circuit 14, synchronization codeword detector 16, address codeword detector 23, alert and output signal generator 22, and decoder control 20. Timing signals into alert and output signal generator 22 determine the alert signal frequencies and durations.

Finally, decoding controller 20 controls the overall operation. Decoding controller 20 may be comprised of specific circuits or may in fact consist of a host microcomputer such as an MC146805H2 made commercially available by Motorola, Inc.

For a more detailed description of the structure and operation of a selective call radio paging receiver of the type shown in FIG. 1, reference is made to U.S. Pat. No. 4,518,961 issued May 21, 1985 and entitled "Universal Paging Device With Power Conservation"; U.S. Pat. No. 4,649,583 issued Mar. 10, 1987 and entitled "Radio Paging Device With Improved Test Modes"; and U.S. Pat. No. 4,755,816 issued Jul. 5, 1988 and entitled "Battery Saving Methods for Selective Radio Paging Receiver", the teachings of which are hereby incorporated by reference.

Figure 2:
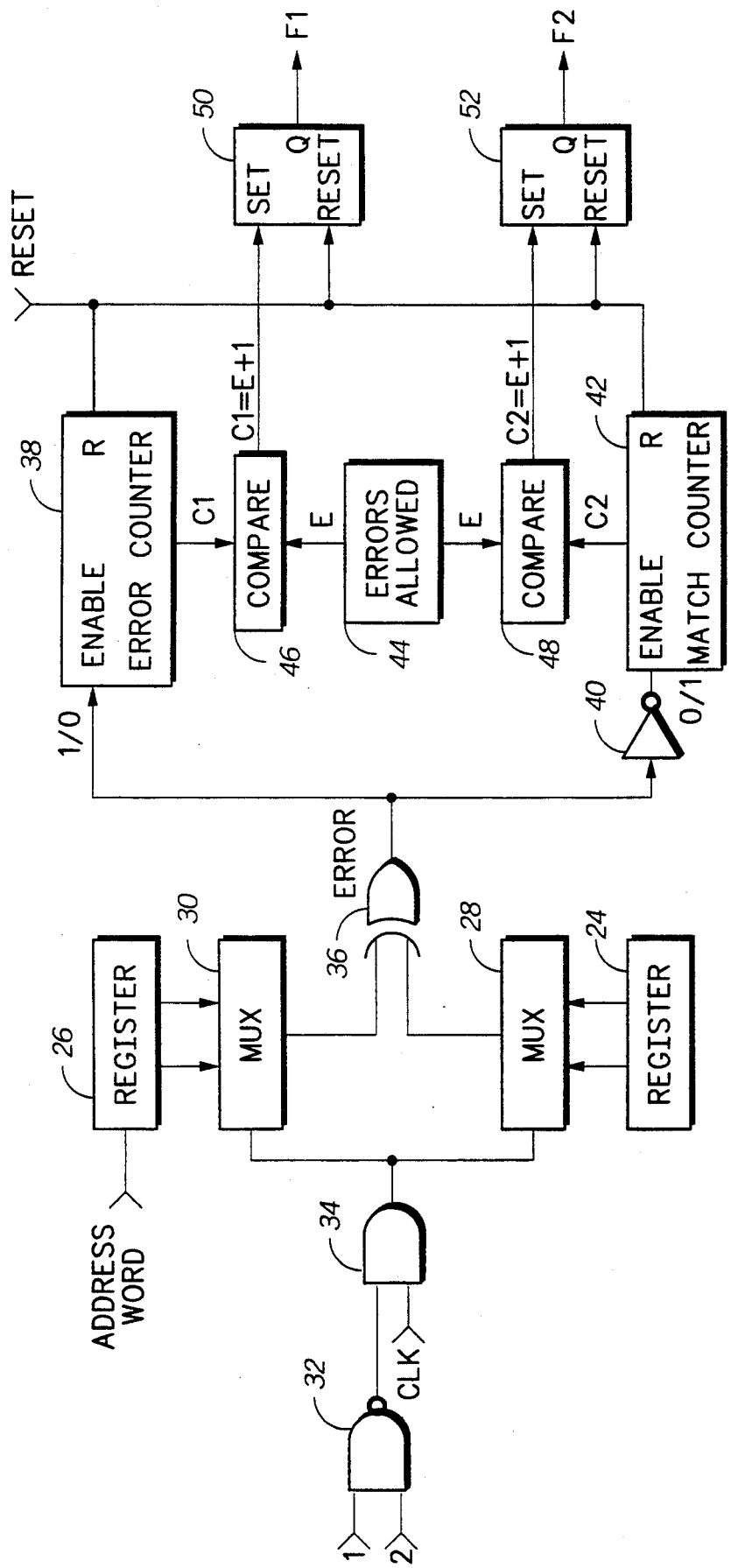
FIG. 2 is a block diagram of the inventive serial comparison apparatus.

FIG. 2 is a block diagram of the inventive serial comparison apparatus which may be used to compare the incoming address with both the true and complement versions of an address assigned to the specific pager and stored therein. The address assigned to the pager comprises a plurality of bits each occupying a specific bit position and may be stored in register 24. The incoming binary address word also comprising a plurality of bits each occupying a specific bit position is stored in register 26. The outputs of registers 24 and 26 are applied to inputs or mulitplexers 28 and 30 respectively.

As long as the output of NAND gate 32 is high, AND gate 34, having a first input coupled to the output of NAND gate 32 and a second input coupled to a source of clock signals (CLK), will pass the clock signals to multiplexers 28 and 30. The clock pulses will enable multiplexers 28 and 30 to serially apply corresponding bits of the address words stored in register 24 and the incoming address words stored in register 26 to first and second inputs of exclusive OR logic 36. 5 If the bits applied to the inputs of exclusive OR logic 36 from multiplexers 28 and 30 are the same, exclusive OR logic 36 will generate a low or logical "0" at its output. If, on the other hand, the bits applied to exclusive OR logic 36 are opposite (i.e. a logical "0" and a logical "1"), the output of exclusive OR logic 36 will go high indicating an error. Stated differently, when the bits occupying corresponding bit positions in registers 24 and 26 differ, and are applied to the inputs of exclusive or logic 36, a logical high error signal will be produced. The output of exclusive OR logic 36 is applied to the input of error counter 38 and, after inversion in inverter 40, to the input of match counter 42. Thus, if corresponding bits differ, a logical one is generated which is counted in error counter 38. Since this high signal will be inverted by inverter 40, match counter 42 is not incremented. If, on the other hand, the bits being compared are the same, a logical "0" will appear at the output of exclusive OR logic 6 which causes a logical "1" to appear at the output of inverter 40. In this case, match counter 42 would be incremented.

A third register 44 stores a binary representation of a number (E) of errors which will be tolerated in the received address word. The binary representation of E is applied to first sets of inputs of comparators 46 and 48. The contents of binary error counter 38 is applied to a second set of inputs of comparator 46, and the contents of binary match counter 42 is applied to a second set of inputs of comparator 48.

As stated previously, the received address word may be the true version of the address word stored in register 24 or may in fact be its complement. If it were determined early in the comparison phase that the received address word is neither the true nor complement version of the stored address word, the comparison process could be terminated thus consuming less power. This is accomplished as follows. When the contents (C1) of error counter 38 exceeds the contents of register 44 (i.e. C1=E+1) as determined by comparator 46, a flip-flop 50 is set thus generating a signal F1. This signal indicates that the received address word contains too many errors to be the true version of the stored address word.

When the contents (C2) of binary match counter 42 exceeds the contents of register 44 (C2=E+1), comparator 48 would generate a signal which sets flip-flop 52 causing a signal F2 to be generated. Flip flops 50 and 52 are reset at the beginning of each comparison cycle.

Referring now to NAND gate 32, signals F1 and F2 generated by flip-flop 50 and 52 respectively are applied to first and second inputs of gate 32. As long as both F1 and F2 are not high, the output of gate 32 will be high thus enabling AND gate 34. If, however, both F1 and F2 are high, gate 32 will generate a logical "0" thus disabling AND gate 34 and preventing clock pulses (CLK) from passing therethrough. In this case, multiplexers 28 and 30 will be disabled and the comparison process halts.

In summary, if, after comparing the address word with the stored word, flip-flop 50 is set (F1 high) and flip-flop 52 is reset (F2 low) it may be concluded that the received address word is the inverse of the address word stored in register 34. If, on the other hand, F2 is high and F1 is low at the end of the comparison process, it may be concluded that the received address word matches the address stored in register 24. If both F1 and F2 become high, the received address word is neither the true nor the complement version of the address word stored in register 24, and as soon as both F1 and F2 become high, the comparison process may be discontinued.

The above description is given by way of example only. Changes in form and details may be made by one skilled in the art without departing from the scope of the invention. For example, while a number of errors and matches are shown as being compared to the same error threshold (E), it is certainly possible to use different error thresholds for the true and complement versions of the input address word.

What is claimed is:

1. An apparatus for comparing a first binary word capable of assuming first and second states with a second binary word, each including a plurality of bits occupying specific bit positions, said apparatus comprising:

first means for serially comparing the bits occupying corresponding bit positions of said first and second binary words and including means for generating a first output signal for each match detected and a second output signal for each mismatch detected;

counting means for providing first and second counts of said first and second output signals being detected, the counts identifying the relative correlation between the second binary word and the first and seconds states of the first binary word;

means for generating a first error count signal when the first count exceeds a first predetermined number, and for generating a second error count signal when the second count exceeds a second predetermined number; and means, coupled to said error count generating means and responsive to the coincidence of said first and second error count signals being generated for disabling further comparison of said first and second binary words by said first means, whereby comparison of the first and second binary words is terminated when the first and second states of the first binary word fail to correlate with the second binary word.

2. The apparatus according to claim 1, wherein the second state of the first binary word is the complement of the first state of the first binary word.

3. The apparatus according to claim 1 wherein said first and second predetermined numbers are the same.

4. The apparatus according to claim 3 wherein said first means comprises:

first logic means for serially comparing the bits of said first and second binary words and for generating said second output signal for each mismatch; and first inverter means coupled to the said logic means for inverting said second output signal to produce said first output signal.

5. The apparatus according to claim 4 wherein said first logic means comprises:

first storage means for storing said first binary word;
   second storage means for storing said second binary word;
   first multiplexer means, coupled to said first storage means, for serially producing the bits of said first binary word at its output;
   second multiplexer means coupled to said second storage means, for serially producing the bits of said second binary word at its output; and
   exclusive-OR logic means having inputs coupled to said outputs of said first and second multiplexer means for producing said second output signal.

6. The apparatus according to claim 5 wherein said first and second storage means comprise first and second registers.

7. The apparatus according to claim 3 wherein said counting means comprises:

a first counter, coupled to said first means, for providing the count of said first output signals; and
   a second counter, coupled to said first means, for providing the count said second output signals.

8. The apparatus according to claim 7 wherein said means for generating comprises:

comparing means for comparing the count of said first and second counters with said first predetermined number; and
   third means coupled to said comparing means for generating said first and second error count signals.

9. A method for comparing a first binary word capable of assuming first and second states with a second binary word to determine correlation therebetween, each binary word including a plurality of bits occupying specific bit positions, said method comprising the steps of:

serially comparing at least some of the bits occupying corresponding bit positions of the first and second binary words in a comparison means;

counting the number of matches being detected between corresponding bits of the first and second binary words to identify the relative correlation between the second binary word with the first state of the first binary word;

counting the number of mismatches being detected between corresponding bits of the first and second binary words to identify the relative correlation between the second binary word with the second state of the first binary word;

comparing the number of mismatches detected with a predetermined number, and generating a first error count signal when the number of mismatches detected exceeds the predetermined number;

comparing the number of matches detected with the predetermined number, and generating a second error count signal when the number of matches detected exceeds the predetermined number; and generating a signal inhibiting further comparison by the serial comparison means upon detecting a coincidence of the first and second error count signals, the coincidence indicating a failure of the first and second states of the first binary word to correlate with the second binary word.

10. The method of comparing first and second binary words according to claim 9, wherein the second state of the first binary word is the complement of the first state of the first binary word.

11. An apparatus for comparing a first binary word capable of assuming first and second states with a second binary word, each comprised of a plurality of bits, said apparatus comprising:

first comparing means for serially comparing at least some of the bits of said first and second binary words;

first counting means coupled to said first comparing means for generating a first count of the number of bits of said first binary word which correspond to said second binary word to identify the relative correlation between the second binary word with the first state of the first binary word;

second counting means coupled to said first comparing means for generating a second count of the number of bits of said first binary word which do not correspond to said second binary word to identify the relative correlation between the second binary word with the second state of the first binary word; and disabling means coupled to said first comparing means and to said first and second counting means for disabling said first comparing means as soon as said second binary word does not match the first state of the first binary word or the second state of the first binary word.

12. The apparatus according to claim 11, wherein the second state of the first binary word is the complement of the first state of the first binary word.

13. The apparatus according to claim 11 wherein said first comparing means comprises:

first means, coupled to the first counter means, for generating an error output signal for each bit position in said first and second binary words which do not match; and inverter means, coupled to said first means and having an output coupled to said second counter means, for inverting said error output signal.

14. The apparatus according to claim 13 wherein said disabling means includes means for generating a first error count signal for effecting the disabling of said first comparing means when the contents of said first counting means exceeds a predetermined number, and means for generating a second error count signal for effecting the disabling of said first comparing means when the contents of said second counting means exceeds a predetermined number.

15. An apparatus for comparing a first binary word capable of assuming first and second states with a second binary word, each including a plurality of bits occupying specific bit positions, said apparatus comprising:

first means for serially comparing at least some of the corresponding bits in said first and second binary words;

second means for generating a first error count signal when the number of mismatches exceeds a first predetermined number thereby identifying the correlation between the second binary word with the first state of the first binary word; and third means for generating a second error count signal when a number of matches exceeds a second predetermined number thereby identifying the correlation between the second binary word with the second state of the first binary word; and means, coupled to said first means and responsive to the coincidence of said first and second signals for disabling said first means whereby comparison of the first and second binary words is terminated when the first and second states of the first binary word fail to correlate with the second binary word.

16. The apparatus according to claim 15, wherein said means for disabling disables said first means upon the occurrence of said first and second error count signals.

17. The apparatus according to claim 16 wherein said first and second predetermined numbers are the same.

18. The apparatus according to claim 15, wherein the second state of the first binary word is the complement of the first state of the first binary word.

* * * * *